J. R. TOWNSEND.
ELECTRIC SWITCH.
APPLICATION FILED SEPT. 20, 1919.
1,337,628.
Patented Apr. 20, 1920.
2 SHEETS—SHEET 1.
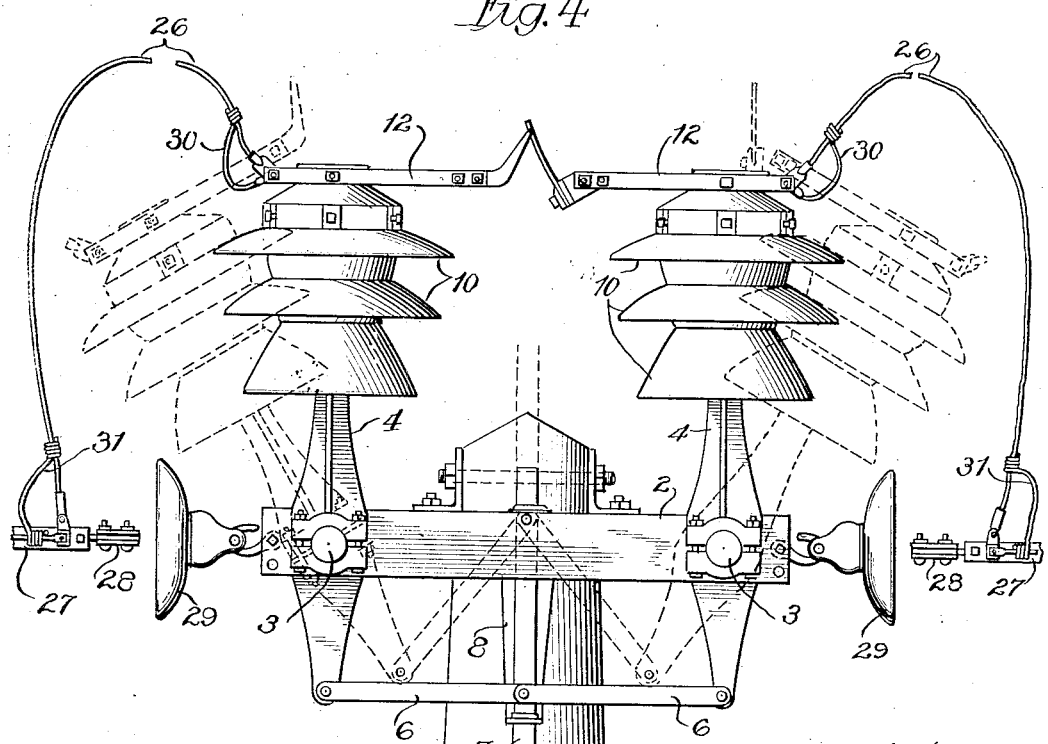
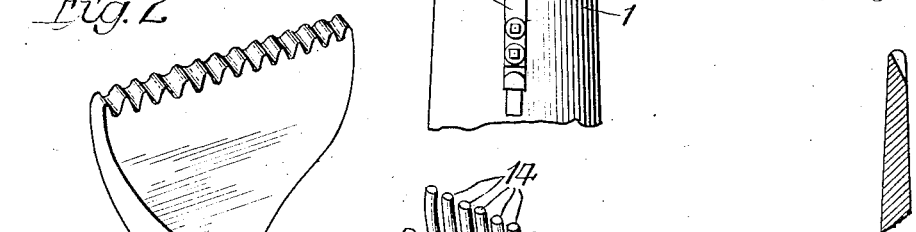
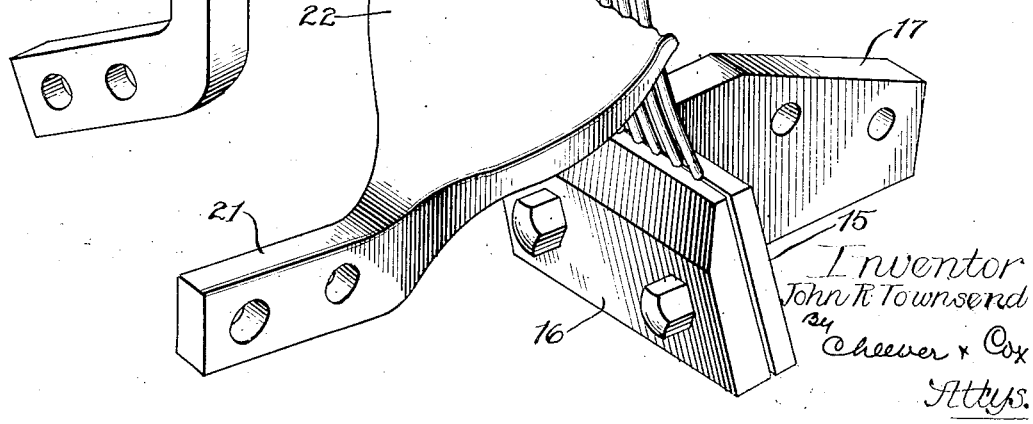
Inventor
John R. Townsend
By Cheever & Cox
Attys.

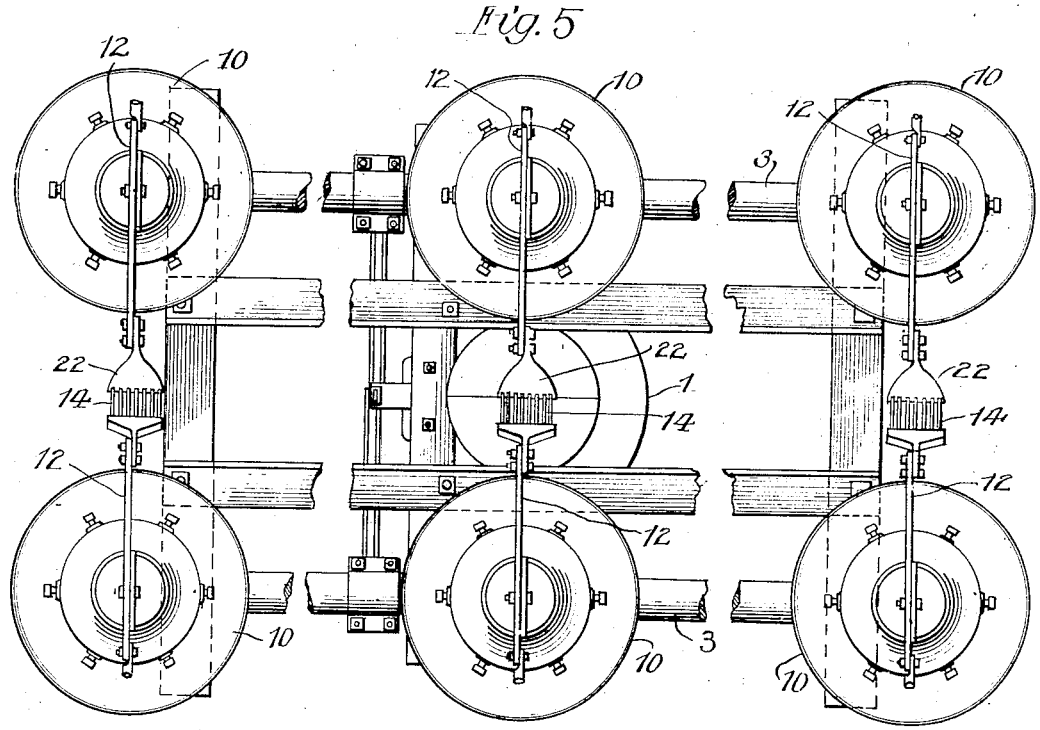
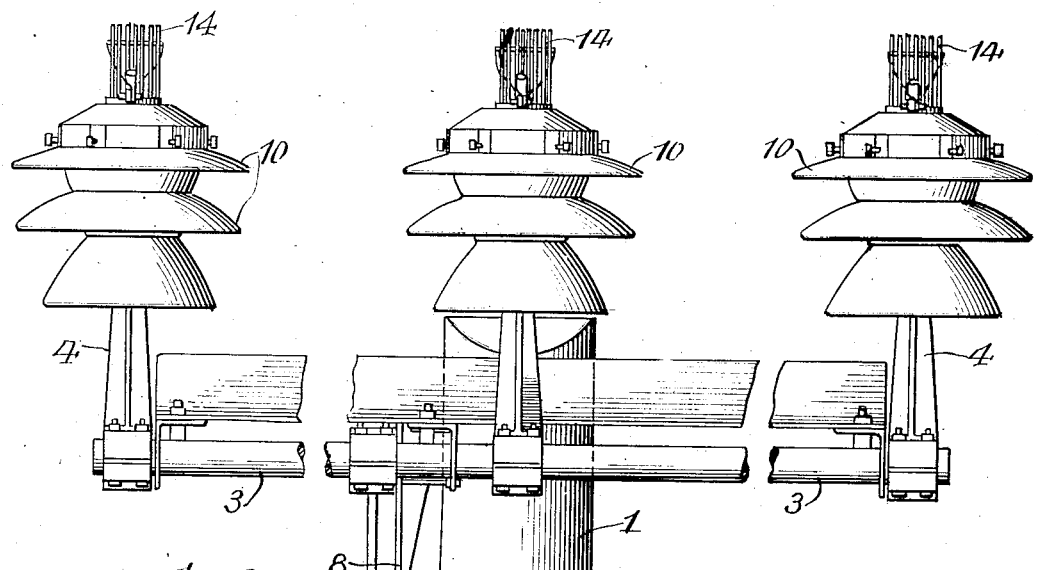

UNITED STATES PATENT OFFICE.

JOHN R. TOWNSEND, OF SOUTH BEND, INDIANA.

ELECTRIC SWITCH.

1,337,628.  Specification of Letters Patent.  Patented Apr. 20, 1920.

Application filed September 20, 1919. Serial No. 325,217.

*To all whom it may concern:*

Be it known that I, JOHN R. TOWNSEND, a citizen of the United States, residing at South Bend, in the county of St. Joseph and State of Indiana, have invented a certain new and useful Improvement in Electric Switches, of which the following is a specification.

My invention resides in an improved electric contactor or switch designed especially for outdoor use, where the device is normally subject to weather condition. It is particularly useful for overhead high tension transmission. It will be understood by those skilled in the art that it is frequently desirable to sectionalize long distance transmission lines. In case of trouble at any part of the line it becomes desirable to temporarily deënergize that section of the line where the trouble is located. But in the case of overhead transmission, especially in high tension work, the lines are out of reach of a man on the ground and on account of this and other practical considerations the switches must be of a type such that they can be mechanically operated from a distance—that is, from a point within reach of a man on the ground. Practical considerations also require that the switches be open and exposed instead of inclosed. As the currents transmitted are usually large it is important that resistance at the switch be reduced to a minimum. This is a difficult thing to insure, especially in a climate where sleet and snow frequently occur in winter time. Another difficulty resides in the fact that these switches are not usually operated with much frequency and for this reason and on account of the oxidizing action of the current the parts are apt to corrode, thus interposing undesirable resistance. Another source of difficulty is that the insulators and their supports are of large dimensions and hence do not readily lend themselves to accurate workmanship and it becomes difficult to make the parts of the switch coördinate properly. The object of my invention is to provide a switch which will solve these and other difficulties and meet the situation in an electrically and mechanically efficient manner and at a reasonable cost.

I accomplish my objects by the mechanism illustrated in the accompanying drawings, in which—

Figure 1 is a perspective view of the principal switch elements.

Fig. 2 is a perspective view of what may be termed the solid terminal or switch element.

Fig. 3 is a sectional view of the acting edge of the element shown in Fig. 2.

Fig. 4 is a side elevation of my switch installed in an overhead transmission system.

Fig. 5 is a top plan view of the parts shown in Fig. 4, and

Fig. 6 is an elevation of the parts shown in Fig. 4, but viewed from a different side.

Like numerals denote like parts throughout the several views.

In the form selected to illustrate the invention the electrical parts are mounted at the top of a pole 1 here indicated as being of wood, but which may be constructed of metal. At the top of the pole is a cross arm 2 having two shafts 3 which serve as fulcrums for the main arms 4. These main arms are individually connected by links 6 to a rod 7 which is guided vertically within a bracket 8 mounted upon the pole. The parts are so constructed and arranged that when the push rod 7 is in down position shown in full lines in Fig. 4 the arms 4 will stand upright and the switch will be closed. When the push rod is pushed upward as shown in dotted lines in Fig. 4 the upper ends of the arm 4 will swing outward and the switch will be opened. Said push rod extends down to a point near the ground where it is controlled by mechanism of any suitable type. It is sufficient for the present purpose to say that the control mechanism is so designed that it will hold the push rod either in raised or lowered position, as desired.

At the top of the upstanding arms 4 are carriers 12 to which the switch contacts or terminals are fastened. These contacts or terminals, shown in perspective in Fig. 1, are adapted to be bolted or otherwise secured to the carriers. One of said contacts is provided with a plurality of rods 14 which are free at one end and rigidly fastened together at the other, preferably by means of a clamp consisting of two coöperating members 15, 16 adapted to be bolted or otherwise rigidly fastened together. One of the parts is integral with or fastened to a stem 17 by which the clamp is fastened to the carrier. The clamp is so constructed that it holds the wires parallel with each other and arranged in a common plane.

The coöperating contact has a stem 21 or equivalent means by which it is fastened to its carrier 12. The acting portion 22 of this contact is broad and preferably relatively flat, and so arranged that when the switch is closed it will present its edge to the sides of the wires 14 between the ends thereof. In the best form the acting edge of said contact is serrated so as to form notches in which the individual wires may seat. This causes the contact to engage a greater portion of the circumference of the wire and tends to steady the parts by preventing relative sidewise movement when the switch is closed. It is desirable also that the solid blade contact 22 be wider than the row of wires so that all of the wires will be sure to find a notch even though the parts are not accurately alined sidewise. It will be understood that as it is not commercially practicable to form such sectionalizing apparatus with great nicety, and the parts being apt to wear on account of their exposure and the stresses and strains, arising from the mechanical tension of the transmission lines, are apt to get out of alinement to a certain extent; but with my construction this will not reduce the amount of contacting surface so long as the parts remain alined within reasonable limits.

While the manner of connecting the switch contacts to the transmission lines electrically is not essential, I have suggested practical means which consist of comparatively stout but flexible conductors 26. One end of each conductor is mechanically connected to the rear end of its respective carrier 12 and the other end to the line conductor 27. The line conductors are fastened by means of clamps 28 and insulators 29, or other suitable means, to the cross arm 2. It is desirable to provide jumpers 30 for perfecting the electric connection between said conductors and their respective carriers 12, also to provide jumpers 31, to perfect the electric connection between said conductors 26 and the transmission lines 27.

In operation, when it is desired to sectionalize the line, the push rod 7 is raised, thus "breaking" the toggle links 6 and swinging the arms 4 to open position as shown in dotted lines Fig. 1. When it is desired to reconnect the lines the push rod is pulled down, thus straightening the links 6 and bringing the switch contact to closed position as shown in Fig. 1 and in full lines in Figs. 4 and 5. The parts are so designed that when the switch is thus closed the broad contact 22 will present its serrated edge to the side of the wires 14 with sufficient pressure to hold them perceptibly, if not considerably, flexed. With a toggle mechanism such as I have shown this condition may be readily obtained without creating an upward tension on the push rod 7 because at this time, when the preferred construction is used, the toggle links 6 will be in alinement and the switch will be locked in closed position. This construction of the switch contacts possesses several advantages. In the first place, the flexed wires will exert pressure against the engaged edge of the mating contact 22, thus reducing the electrical resistance. But more important still is the fact that the flexing of the wires will cause them to produce a rubbing action, lengthwise of the wires, against the engaged edge of the coöperating contact, thus tending to polish the surfaces and promote the efficiency of contact. In case snow or sleet shall have formed upon the surface of the parts, the pressure will tend to express it—that is, cause it to exude and let the parts finally come into engagement, especially if the current is not entirely cut off. If any current can flow, it will soon melt the snow or ice which may intervene. Furthermore, as the wires are capable of yielding individually, contact may still be obtained even though some of said wires are blocked out of engagement by reason of ice, or any other foreign matter. Again, as the wires are separate except at the base, the flexing and deflexing movements will tend to separate them in case a previous overload has caused them to weld together slightly.

From the foregoing it will be evident that the construction of the parts is simple and yet maximum contacting area will be afforded, the contact area will tend to be kept bright and the parts will otherwise operate in efficient manner even though subjected to weather conditions and even though through careless installation or the stress of working conditions the parts are more or less out of alinement.

Having thus described my invention what I claim as new and desire to secure by Letters Patent, is:—

1. A switch having two contacts one of which is movable relatively to the other; one of said contacts having a plurality of flexible wires arranged substantially in a plane and rigidly connected together at one end, and the other contact being adapted to engage the side of said wires and to flex them when the switch contacts are in closed position.

2. A switch having two relatively movable contacts one of which has a plurality of flexible wires and means for holding said wires parallel to each other in a common plane, said means leaving one end of the wires free; and the other contact being adapted to extend across a plurality of said wires and hold the same flexed when the switch is closed, the last mentioned contact engaging the wires at a point between their ends.

3. A switch having two contacts one of which is movable transversely to the other, one contact having parallel flexible wires fastened together at one end and free at the other, said wires being arranged substantially in a common plane; the coöperating contact being adapted to engage the sides of a plurality of said wires simultaneously, between the ends thereof, said coöperating contact, when the parts are in closed position, being adapted to hold the wires so flexed that they conform to a cylindrical surface with the wires running parallel to each other but in planes perpendicular to the axis of the cylinder.

4. A switch having two relatively movable contacts one of which has a plurality of flexible wires and means for holding said wires parallel to each other in a common plane, said means leaving one end of the wires free; and the other contact being broad and comparatively flat and adapted to present its edge to the sides of the wires and to hold them flexed when the switch contacts are in closed position.

5. A switch having two relatively movable contacts one of which has a plurality of flexible wires and means for holding said wires parallel to each other in a common plane, said means leaving one end of the wires free; and the other contact being broad and comparatively flat and adapted to present its edge to the sides of the wires and to hold them flexed when the switch contacts are in closed position, the last mentioned contact having serrations in its edge for receiving the individual wires.

6. A switch having two relatively movable contacts one of which has a plurality of flexible wires and means for holding said wires parallel to each other in a common plane, said means leaving one end of the wires free; and the other contact being broad and comparatively flat and adapted to present its edge to the sides of the wires and to hold them flexed when the switch contacts are in closed position, the last mentioned contact having serrations in its edge for receiving the individual wires, and the serrated edge being wider than the set of wires whereby all of the wires will be engaged even though the switch contacts are not accurately alined, center to center.

In witness whereof, I have hereunto subscribed my name.

JOHN R. TOWNSEND.